July 16, 1968     A. MOUTET ETAL     3,392,528
HYPERGOLIC SYSTEMS, IN PARTICULAR FOR USE IN ROCKET ENGINES
Filed Feb. 10, 1965
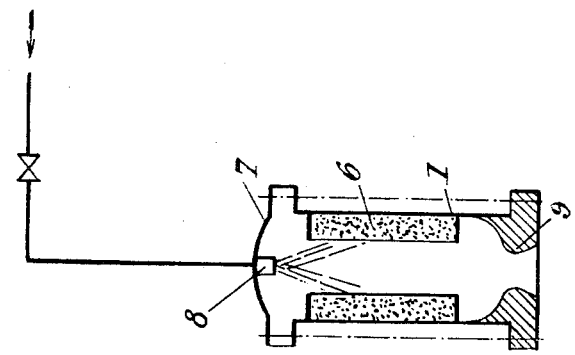
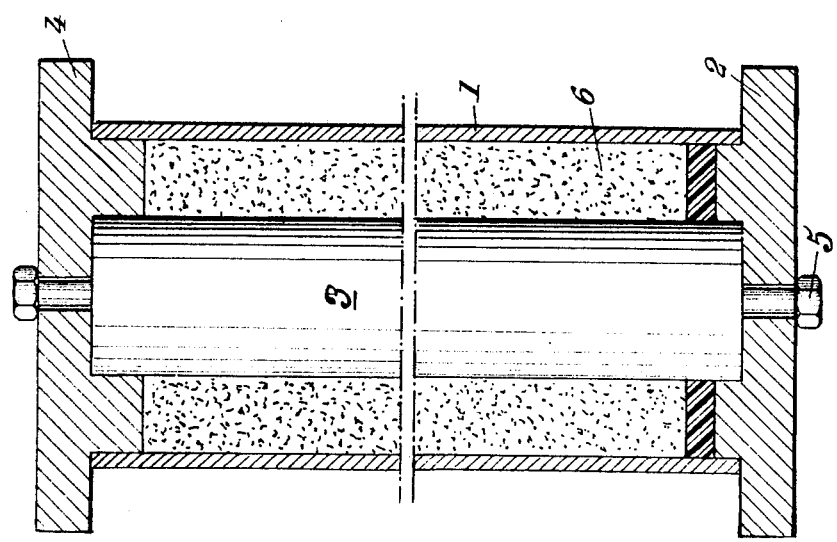

3,392,528
HYPERGOLIC SYSTEMS, IN PARTICULAR FOR USE IN ROCKET ENGINES
André Moutet and Hélène Moutet, Villaine par Massy, France, assignors to Office National d'Etudes et de Recherches Aerospatiales O.N.E.R.A., Bagneux, Hauts-de-Seine, France, a body corporate
Continuation-in-part of applications Ser. No. 49,650, Aug. 15, 1960, Ser. No. 176,874 and Ser. No. 176,875, Feb. 28, 1962. This application Feb. 10, 1965, Ser. No. 431,611
Claims priority, application France, Sept. 2, 1959, 804,079; Dec. 12, 1959, 812,889; July 12, 1960, 832,807; Mar. 2, 1961, 854,351; Mar. 3, 1961, 854,441
5 Claims. (Cl. 60—220)

ABSTRACT OF THE DISCLOSURE

This invention is directed to hybrid rocket motor propulsion systems in which primary components consisting of hypergolic fuels and oxidizers selectively are supplemented by less reactive fuels or oxidizers in predetermined proportions in order to adjust or control the reactivity and energy release of the primary components. For example, the primary hypergolic components may consist of a solid fuel such as lithium hydride and a fluid oxidizer such as nitric acid and the solid fuel component may be supplemented by a solid fuel constituent, such as a polyethylene, that is less reactive to the fluid oxidizer than is the lithium hydride, and the lithium hydride would comprise from 96% to 40%, by weight, of the total solid fuels and the polyethylene would comprise from 4% to 60% thereof.

*Related applications*

The present application is a continuation-in-part of our prior applications: Ser. No. 49,650 filed Aug. 15, 1960, for "Hypergolic Systems, in Particular for Use in Rocket Engines," Ser. No. 176,875 filed Feb. 28, 1962, for "Lithergol, in Particular for Hypergolic Systems, Having a Polymerized Resin Incorporated Therein and Methods of Making Such Lithergols," and Ser. No. 176,874 filed Feb. 28, 1962 for "Lithergols Having a Polymerized Resin Incorporated Therein and in Methods of Making Them," all now abandoned.

The present invention relates to systems for producing gases under pressure, in particular for use in a rocket motor, said systems comprising two stable components or phases, respectively a fuel and an oxidizer, one solid and the other fluid, capable in the conditions of utilization of reacting with each other hypergolically, that is to say spontaneously, when merely placed in the contact of each other, without the help of external means, said solid component being not porous and said two components being not mixable with each other nor soluble in each other.

The object of our invention is to provide a system of this kind which is better adapted to meet the requirements of practice than those known up to this time, in particular concerning the control of the reaction that is produced between the components of the system.

For this purpose, according to our invention, at least one of the above mentioned components comprises, in addition to the constituent thereof hypergolic with the other component, at least one supplementary constituent the nature and relative amount of which are capable of adjusting the reactivity and the energetic power of the hypergolic system formed by said components.

Of course, choice of the constituent or constituents of the fluid component and choice of the constituent or constituents of the solid component hypergolic with said fluid component should be made with reference to each other because a fuel component is not hypergolic in itself but when considered in relation to a given oxidizer. For instance a fuel constituent may be non hypergolic with nitric acid whereas it is hypergolic with fluorine.

Preferred embodiments of the present invention will be hereinafter described with reference to the accompanying drawings, given merely by way of example, and in which:

FIG. 1 shows, in axial section with portions cut away, the combustion chamber of a rocket motor made according to the invention.

FIG. 2 diagrammatically shows the essential elements of a rocket motor made according to the invention.

The general term "constituent" will be applied in what follows to each of the chemical bodies (fuels or oxidizers) entering, either alone or in association (for instance by mixture, solution, juxtaposition, dispersion, etc.), in the composition of one or the other of the two phases which form the hypergolic system.

On the other hand, we will call "component" of the system each of said phases, which as above stated, are separately stable but have, with respect to each other, a hypergolic character, that is to say are such that, when they are merely brought into contact with each other in the conditions of utilization they react spontaneously without it being necessary to start this reaction through special means.

The constituents are distributed into at least two distinct components one of which, intended to be housed in the combustion chamber of the rocket motor, is in the solid form, and the other of which, intended to be gradually fed into said combustion chamber from a fluid-tight compartment in which it was held in reserve, is in the fluid form (liquid or gaseous).

Each phase, considered separately, is stable, but the two phases constitute the components of a hypergolic system when they are brought into contact with each other in the conditions of utilization by sweeping of a free surface of the solid phase by a stream of the fluid phase.

The two components are such that the solid one has, with respect to the fluid one, no substantial character of solubility, miscibility of the like which would prevent the possibility of controlling the area of the surface of contact between said two components when they are brought into contact with each other.

It will be understood that such a hypergolic system has a great safety of operation, due to the fact that the reactions between its components take place by a contact produced between a surface of definite area of the solid component and the fluid component fed to the combustion chamber. In other words, due to the fact that the internal layers of the solid component cannot react with the fluid component as long as said internal layers have not been brought to the surface by destruction of the superficial layers, there will be an automatic limitation of the reaction.

On the other hand, it will be possible, by varying the flow rate of the fluid component sent into the combustion chamber, to vary within wide limits the pressure existing in said combustion chamber and, finally, to adjust the thrust supplied by the rocket motor.

Finally, the combustions that take place always have a character of high stability, even for small differences between the pressure of injection of the fluid component and the mean pressure existing in the combustion chamber, this high stability being due to the fact that, as a consequence of the impossibility of interpenetration of the two components with respect to each other, the proportion of the components entering into reaction per unit of area of the solid component reached by the stream of the fluid component, remains substantially constant for a given flow rate of said stream.

The solid fuel component of the system may be completed, on the one hand, by a powder of at least one metal, such as aluminum, beryllium, magnesium, lithium, having a high energetic power and capable of forming with the fluid component produced during the reaction a metallic compound, preferably liquid or gaseous at high temperature, and, on the other hand by a plastic constituent, preferably a thermo-plastic one, intended in particular to facilitate, by its local melting and sublimation, the evacuation of said metallic compound formed when the two components of the system are brought into the presence of each other.

Preferably in this case, and as it will be hereinafter supposed, the two components of the system are made in such manner that the solid fuel component consists exclusively of fuel constituents and the fluid oxidizer component consists exclusively of one or several oxidizer constituents.

There may be, at least in one component, at least one supplementary constituent (of one kind or the other, i.e. either an oxidizer or a fuel) and this supplementary constituent may be:

(I) Either of the same kind as the hypergolic constituent of this component.

(II) Or of the other kind.

In the first alternative (supplementary constituent of the same kind as the hypergolic constituent with which it is mixed) there are four cases, to wit:

(IA) The hypergolic solid component is a fuel and the hypergolic fluid component is an oxidizer, the solid component comprising, on the one hand, at least one fuel constituent hypergolic with the fluid oxidizer component and, on the other hand, at least one supplementary fuel constituent less reactive with said fluid oxidizer component.

(IB) The hypergolic solid component is a fuel and the hypergolic fluid component is an oxidizer, the fluid component comprising, on the one hand, at least one oxidizer constituent hypergolic with the solid fuel component and, on the other hand, at least one supplementary oxidizer constituent the nature and relative amount of which are capable of adjusting the reactivity and the energetic power of the hypergolic system formed by said components and, in particular, which may be less reactive with said solid fuel component.

(IC) The hypergolic solid component is an oxidizer and the hypergolic fluid component is a fuel, the fluid component comprising, on the one hand, at least one fuel constituent hypergolic with the solid oxidizer component and, on the other hand, at least one supplementary fuel constituent less reactive with the solid oxidizer component.

(ID) The hypergolic solid component is an oxidizer and the hypergolic fluid component is a fuel, the solid component comprising, on the one hand, at least one oxidizer constituent hypergolic with the fluid fuel component and, on the other hand, at least one supplementary oxidizer constituent the nature and relative amount of which are capable of adjusting the reactivity and the energetic power of the hypergolic system formed by said components and, in particular, which may be less reactive with said fluid fuel component.

When there are two supplementary constituents, one an oxidizer and the other a fuel, each of them may be mixed with the hypergolic constituent of the same kind and, we have, for instance:

(IA+IB) A hypergolic oxidizer fluid constituent mixed with a supplementary oxidizer fluid constituent and a hypergolic fuel solid constituent mixed with a supplementary fuel solid constituent;

(IC+ID) A hypergolic fuel fluid constituent mixed with a supplementary fuel fluid constituent and a hypergolic oxidizer solid constituent mixed with a supplementary oxidizer solid constituent.

In the second alternative (supplementary constituent of a kind opposed to that of the hypergolic constituent with which it is mixed), there are also four cases, to wit:

(IIA) The hypergolic fluid component is at least one oxidizer and the hypergolic solid component comprises at least one fuel constituent which is hypergolic with said fluid oxidizer component and at least one supplementary constituent consisting of an oxidizer which is not hypergolic with said fuel solid constituent and mixed therewith;

(IIB) The hypergolic solid component is at least one fuel and the hypergolic fluid component comprises at least one oxidizer constituent which is hypergolic with said solid fuel component and at least one supplementary constituent consisting of a fuel which is not hypergolic with said oxidizer of said fluid constituent and mixed therewith:

(IIC) The hypergolic solid component is at least one oxidizer and the hypergolic fluid component comprises at least one fuel constituent which is hypergolic with said solid oxidizer component and at least one supplementary constituent consisting of an oxidizer which is not hypergolic with said fuel fluid constituent and mixed therewith;

(IID) The hypergolic fluid component is at least one fuel and the hypergolic solid component comprises at least one oxidizer constituent which is hypergolic with said fuel fluid component and at least one supplementary constituent consisting of a fuel which is not hypergolic with said oxidizer solid constituent and mixed therewith.

When there are two supplementary constituents, one an oxidizer and the other a fuel, each of them may be mixed with the hypergolic constituent of the other kind and, we have, for instance:

(IIA+IID) A hypergolic oxidizer fluid constituent mixed with a supplementary fuel fluid constituent and a hypergolic fuel solid constituent mixed with a supplementary oxidizer solid constituent;

(IIC+IID) A hypergolic fuel fluid constituent mixed with a supplementary oxidizer fluid constituent and a hypergolic oxidizer solid constituent mixed with a supplementary fuel solid constituent.

We will finally consider the case (III) where at least one of the components (either the fluid one or the solid one) of the hypergolic system comprises at least three constituents at least one of which is of a kind (either fuel or oxidizer) opposed to that of said component.

We will now state examples corresponding to these various cases.

The hypergolic oxidizer fluid constituent is any suitable oxidizer, for instance nitric acid ($NO_3H$), nitrogen peroxide ($N_2O_4$), hydrogen peroxide ($H_2O_2$), liquid oxygen, liquid halogens and in particular liquid fluorine, halogen oxides such as oxygen fluoride and bromine oxide, halogen halides such as chlorine trifluoride ($F_3Cl$) and bromine pentafluoride, oxyhalogenated halogen derivatives such as perchloryl fluoride ($ClO_3F$).

The hypergolic fuel solid constituent may be any solid fuel, for instance one chosen among lithium hydride (HLi), beryllium hydride, potassium hydride (HK), sodium hydride (HNa), aluminum hydride, lithium amidide ($NH_2Li$), potassium amidide, sodium amidide ($NH_2Na$), lithium borohydride ($BH_4Na$), potassium borohydride ($BH_4K$), sodium borohydride ($BH_4Na$), beryllium borohydride, lithium alumino-hydride ($LiAlH_4$), potassium alumino - hydride, sodium alumino - hydride, organic amines, in particular paratoluidine, xylidine 1-3-4, para-anisidine, metatoluene diamine, parachloraniline, para-phenylene-diamine, naphtylene diamine 1-5, this fuel solid component being hypergolic with the oxidizer fluid component that is chosen.

When the fuel consists of hydrides of the following metals: lithium, beryllium, potassium, sodium and aluminum, the oxidizers hypergolic with said fuel are nitric acid ($NO_3H$), nitrogen peroxide, hydrogen peroxide ($H_2O_2$), liquid bromine, liquid chlorine, liquid fluorine, oxygen fluoride, bromine oxide, chlorine trifluoride ($F_3Cl$), and bromine pentafluoride.

When the fuel consists of amidides of the following metals: lithium, potassium and sodium, the oxidizers hypergolic with said fuel are nitric acid ($NO_3H$), nitrogen peroxide ($N_2O_2$), hydrogen peroxide ($H_2O_2$), liquid bromine, liquid chlorine, liquid fluorine, oxygen fluoride, bromine oxide, chlorine trifluoride ($F_3Cl$), and bromine pentafluoride.

When the fuel consists of borohydrides of the following metals: lithium, potassium, sodium and beryllium, the oxidizers hypergolic with said fuels are nitric acid, nitrogen peroxide, hydrogen peroxide, liquid bromine, liquid chlorine, liquid fluorine, oxygen fluoride, bromine oxide, chlorine trifluoride, and bromine pentafluoride.

When the fuel consists of alumino-hydrides of the following metals: lithium, potassium and sodium, the oxidizers hypergolic with said fuels are nitric acid ($NO_3H$), nitrogen peroxide ($N_2O_4$), hydrogen peroxide ($H_2O_2$), liquid bromine, liquid chlorine, liquid fluorine, oxygen fluoride, bromine oxide, chlorine trifluoride ($F_3Cl$), and bromine pentafluoride.

When the fuel consists of organic amines, in particular as above cited, the oxidizers hypergolic with said fuels are nitric acid ($NO_3H$), nitrogen peroxide ($N_2O_4$), hydrogen peroxide ($H_2O_2$), liquid bromine, liquid chlorine, liquid fluorine, oxygen fluoride, bromine oxide, chlorine trifluoride ($F_3Cl$), and bromine pentafluoride.

These methods are summed up in the following table:

hand, at least one supplementary fuel constituent less reactive with said fluid oxidizer component.

In this case the supplementary constituent is chosen among the bodies reacting with the oxidizer constituent but less strongly than the hypergolic fuel constituent that has been chosen and it may consist for instance of at least one of the following bodies: polyesters, polyethylenes, polybutadienes, polyisoprenes, polystyrenes, polyamides, polyvinyl chlorides, polyurethane, fluorinated derivatives such for instance as fluorinated alcohols and fluorinated or chlorofluorinated hydrocarbons such as those designated on the market by the trademarks "Teflon" and "Hostaflon."

Concerning the respective proportions of the hypergolic constituent and of the less reactive, or supplementary constituent forming the solid fuel component, we may adopt the following limits, given by way of example:

|  | Percent |
|---|---|
| Hypergolic portion | from 96–40 |
| Less reactive portion | from 4–60 | these proportions being given in weight, as in all the following examples.

It should be well understood that the term "portion" does not imply that this portion is separate from the other portion (or portions). They may be mixed together or dissolved in one another.

As illustrative of the above indications, we will now give particular examples.

Example 1

The hypergolic fluid oxidizer is nitric acid.

The solid component comprises, as hypergolic constituents, lithium hydride and sodium borohydride and, as supplementary constituents, polyesters obtained by polymerization of a phthaleic ester and a maleic or fumaric ester, in solution in styrene, in particular the phthaleic ester of 1-2 propylene glycol and the maleic or fumaric ester of 1-2 propylene glycol.

In particular, we have used, for said supplementary portion, the composition known under the trademark name of Stratyl A 16 and consisting of two parts by weight of the phthaleic ester of 1-2 propylene glycol, and one part of the maleic ester of 1-2 propylene glycol, in solution in styrene, the esters representing 64% of the total mass and styrene 36% thereof.

This composition (Stratyl A 16), which is liquid in the initial state, polymerizes, either in the cold or in the hot state, in the presence of a polymerization catalyst such as sodium borohydride. It has a thermo-hardening character.

|  | Fuels | | | | | |
|---|---|---|---|---|---|---|
| Oxidizers | Lithium Hydride, Beryllium Hydride, Potassium Hydride, Sodium Hydride, Aluminium Hydride | Lithium Amide, Potassium Amide, Sodium Amide | Lithium Borohydride, Potassium Borohydride, Sodium Borohydride, Beryllium Borohydride | Lithium Aluminohydride, Potassium Aluminohydride, Sodium Aluminohydride | Organic Amines in Particular Above Cited | Organo Metallic (or Metalloid) Compounds |
| Nitric acid ($NO_3H$) | Hyp | Hyp | Hyp | Hyp | Hyp | Hyp. |
| Nitrogen peroxide ($N_2O_4$) | Non hyp | Hyp | Hyp | Hyp | Hyp | Hyp. |
| Hydrogen peroxide ($H_2O_2$) | Hyp | Hyp | Hyp | Hyp | Hyp.[1] | Hyp. |
| Liquid oxygen plus fluorine ($O_2+F_2$) | Hyp | Hyp | Hyp | Hyp | Hyp | Hyp. |
| Liquid bromine ($Br_2$) | Hyp | Hyp | Hyp | Hyp | Hyp | Hyp. |
| Liquid chlorine ($Cl_2$) | Hyp | Hyp | Hyp | Hyp | Hyp | Hyp. |
| Liquid fluorine ($F_2$) | Hyp | Hyp | Hyp | Hyp | Hyp | Hyp. |
| Oxygen fluoride ($F_2O$) | Hyp | Hyp | Hyp | Hyp | Hyp | Hyp, |
| Bromine oxide ($Br_2O$) | Hyp | Hyp | Hyp | Hyp | Hyp | Hyp, |
| Chlorine trifluoride ($F_3Cl$) | Hyp | Hyp | Hyp | Hyp | Hyp | Hyp. |
| Bromine pentafluoride ($BrF_5$) | Hyp | Hyp | Hyp | Hyp | Hyp | Hyp. |
| Stable mixture of perchloryl fluoride and chlorine trifluoride ($ClO_3F + ClF_3$) | Hyp | Hyp | Hyp | Hyp | Hyp | Hyp. |

[1] With some.

(IA) We will first consider the case where the hypergolic solid component is a fuel and the hypergolic fluid component is an oxidizer, the solid component comprising, on the one hand at least one fuel constituent hypergolic with the fluid oxidizer component and, on the other It should be noted that the incorporation in each other of the hypergolic fuel constituents and the less reactive constituents comprising the polyesters requires precautions due to possible reactions between the hypergolic fuel constituents and the polyesters or the styrene.

For this reason, it is of interest to make use of a polyester composition having no free acidity which might risk producing a detrimental disengagement of hydrogen when the polyester composition is mixed with the hypergolic fuel. For instance, it is advantageous to make use of the product designated by the trademark name of Stratyl A 16 L manufactured and sold by the Saint Gobain firm.

By way of example, we may cite for the fuel component, the following percentages, respectively:

|  | I, percent | II, percent |
| --- | --- | --- |
| Lithium hydride | 64.5 | 34 |
| Sodium borohydride | 2 | 2 |
| Stratyl A 16 L | 33.5 | 64 |

The solid mass may be elaborated in the following conditions:

Either in a special mold, in which case an unmolding is performed and the mass obtained is fixed in the combustion chamber, for instance by glueing by means of "Stratyl," or directly in the combustion chamber of the rocket, for which purpose we may proceed as indicated with reference to FIG. 1 which represents the combustion chamber.

The three constituents of the solid component are first mixed in a container and the mixture is allowed to rest, in a nitrogen atmosphere, at ordinary temperature, until there is obtained a paste having substantially the consistency of putty, which corresponds to a time period of about six hours.

The paste thus obtained is introduced into the combustion chamber, which may for instance consist of a cylindrical sleeve 1, for instance of duralumin, provided with an end wall 2 serving to support a central cylindrical core 3 capable, by cooperation with the inner wall of sleeve 1, of limiting an annular space intended to be filled with said paste.

Before introduction of said paste, we pour against the inner wall of end face 2 a thin layer of pure "Stratyl" (about 5 mm. thick) intended to protect the injectors during the operation of the rocket engine, this protecting effect being due to the fact that pure "Stratyl" has not a hypergolic character with respect to nitric acid so that the injectors are not reached by the high temperature products resulting from the hypergolic reaction of the fluid oxidizer with the solid fuel.

The paste is then introduced, and when cylindrical sleeve 1 is full, the paste is compressed by means of a second end wall 4 applied against core 3, for instance by means of a screw visible at the top. The whole is then placed in an oven at a temperature of about 60° C. for eight hours, after which it is cooled down to ordinary temperature and the end walls 2 and 4, and also the central core 3, are removed.

The inner wall of cylindrical sleeve 1 is thus lined with a layer 6, made of the solid mass, which is hard, compact, free from cracks and froth and furthermore, which is tightly fixed to the inner wall of said sleeve 1. It should be noted that the removal of end walls 2 and 4 and of core 3 may be made easier by coating these elements with a special varnish.

There remains only, in order to make the rocket engine, to provide cylindrical sleeve 1, as shown by FIG. 2, with the following elements:

On the one hand, at one of its ends, an end wall 7 acting as support for an injector 8 fed, under nitrogen pressure, with nitric acid from a reservoir.

And on the other hand, at the other end, a nozzle 9 the outlet of which, preferably removable, may be made of any suitable refractory material.

It should be noted that, concerning the production of the solid component and that of the rocket engine, we might proceed in a similar manner if use were made, as hypergolic constituent of the solid component, of sodium hydride or potassium hydride instead of lithium hydride.

Example 2

This example is similar to Example 1, but lithium hydride is replaced, either wholly or partly, by any, or several, of the following bodies: lithium amidide, lithium borohydride, lithium alumino-hydride, sodium hydride, sodium amidide, sodium borohydride, potassium hydride, potassium amidide and potassium borohydride.

Example 3

In this example, where the fluid oxidizer also consists of nitric acid, the less reactive solid fuel portion consists of polyethylenes and/or polystyrenes the chemical structure of which permits of incorporating thereto hypergolic fuels of a great variety without risk of secondary chemical reactions.

For instance, as such hypergolic fuel constituent, we have used one or several of the following bodies: lithium hydride, lithium amidide, lithium borohydride, lithium alumino-hydride, sodium hydride, sodium amidide, sodium borohydride, potassium hydride, potassium amidide and potassium borohydride, advantageously in proportions ranging from 40% to 60% by weight of the solid component.

As polyethylenes are normally in the form of a fine powder, they are mixed with the hypergolic fuels that are chosen, also in the form of a fine powder, and the mixed powder thus obtained is poured into a mold identical to that shown by FIG. 1, the whole being brought to a temperature, for instance of 160° C., corresponding to the melting point of the product that is used, the latter being as far as possible compressed during this operation in order to increase the density of the mixture.

After unmolding, we obtain a combustion chamber body provided with a lithergol which is perfectly smooth and homogeneous.

Example 4

The solid fuel component consists of 85% of paratoluidine (hypergolic portion) and 15% of a less reactive portion consisting of 45% of polyvinyl chloride and 55% of butyl phthalate. But the proportion of paratoluidine may be as low as 70% and that of the less reactive portion as high as 30%.

In order to prepare said solid component, we first introduce, into a mixer, in the above stated proportions, the paste constituted by butyl phthalate containing polyvinyl chloride in suspension therein. We then add paratoluidine (in the state of either powder or fragments) and we stir until this last mentioned constituent is dissolved, this operation being preferably conducted at a temperature of about 40° C. We then pour the product thus obtained into a closed mold and melting is performed by heating said mold to a temperature of about 130° C. for two hours. After cooling we obtain a fuel which is homogeneous and not altered by atmospheric agents.

The fluid oxidizer component may be any of the bodies indicated (in the fifth column of the above table) as hypergolic with organic amines.

In this example, same as in all the examples where butyl phthalate will be mentioned, this substance may be replaced by at least one constituent which is less reactive with the hypergolic constituent, this less reactive constituent being advantageously a plastifying substance such for instance as a tricresyl phosphate and butyl adipate and more generally esters of phthalic acid, adipic acid, maleic acid and fumaric acid.

Example 5

The solid fuel component consist of 95% of paratoluidine (hypergolic portion) and 5% of a less reactive portion consisting of 45% of polyvinyl chloride and 55% of butyl phthalate. The preparation of this component is the same as in Example 4.

The fluid oxidizer is the same as in Example 4.

In the case of Example 5 the burning velocity is higher than in the case of Example 4.

The proportion of paratoluidine may range from 70 to 95% of the solid component.

Example 6

The solid fuel component consists of 80% of para-anisidine (hypergolic portion) and 20% of a less reactive portion consisting of a mixture of 45% of polyvinyl chloride and 55% of butyl phthalate. The preparation of this solid fuel component is the same as in Example 1 with the difference that para-anisidine is used instead of paratoluidine.

The fluid oxidizer component may be any of the bodies indicated in the fifth column of the above table as hypergolic with organic amines.

The proportion of para-anisidine may range from 70 to 95% of the solid component.

Example 7

The solid component consists of 85% of paraphenylene-diamine (hypergolic portion) and 15% of a less reactive portion consisting of a mixture of 30% of polyvinyl chloride and 70% of butyl phthalate.

We proceed as stated in Example 4 (paraphenylene-diamine being used instead of paratoluidine).

The fluid oxidizer component may be any of the bodies indicated in the fifth column of the above table as hypergolic with organic amines.

The proportion of paraphenylene-diamine may range from 70 to 95%.

Example 8

The solid component consists of 85% of paraphenylene-diamine to which is added 15% of a mixture consisting of 30% of polyvinyl chloride, 30% of butyl phthalate and 40% of paratoluidine.

Paraphenylene-diamine (85%) and paratoluidine (6%) constitute the hypergolic portion, polyvinyl chloride (4.5%) and butyl phthalate (4.5%) constituting the less reactive portion.

In this example, the proportion of paraphenylene-diamine may range from 60 to 90% of the solid component and the percentage of paratoluidine in the mixture above mentioned ranges from 30 to 50%, the percentage of polyvinyl plasticized with an equal weight of butyl phthalate ranging from 70 to 50%, which corresponds, for said paratoluidine, to a percentage of 20 to 3% of the total solid component weight.

We proceed as stated in Example 4 (paraphenylene-diamine being of course added to the constituents).

The fluid oxidizer component may be any of the bodies indicated in the fifth column of the above table as hypergolic with organic amines.

In the examples which are to follow, the hypergolic constituent is aluminum triethyl (a liquid the boiling point of which is 180° C.), which is hypergolic with gaseous oxygen, even if said oxygen is mixed with a neutral gas, such as nitrogen in the proportions corresponding to those prevailing in the atmosphere.

The supplementary constituent is a resin of the polyester family (for instance in the state of grains), or of the polyethylene family (for instance in the state of a powder).

Example 9

In this example, the constituents are aluminum triethyl (30%) and 70% of a polymerizable and thermo-plastic resin consisting of a polystyrene known under the trademark AFCOLENE T.F. 100 (in this example, same as in Examples 10 and 11, polystyrene may be replaced, either wholly or partly, by a polyethylene).

The constituents are placed in the presence of each other out of contact with air, for instance in a nitrogen atmosphere.

After the constituents have been intimately mixed together, the mixture is heated, for instance by means of an oil bath, at the temperature necessary for producing a softening of the resin (approximately at a temperature ranging from 175° to 180° C.).

The mixture is stirred, for a time ranging from fifteen minutes to one hour according to the importance of the mass, so as to obtain the desired dissolution, after which the whole is allowed to cool down so as to harden.

The fuel component thus obtained, placed in the presence of air, does not ignite spontaneously but gets covered with a layer of alumina which protects it against a more complete oxidation. It may be exposed to the surrounding atmosphere and handled without any substantial combustion reaction being to be feared. On the contrary, this component, when it is not covered with the protective layer of alumina, can react spontaneously when it is placed in contact with oxidizers stronger than air, for instance nitric acid, a mixture of 60% of nitric acid and 40% of nitrogen peroxide, pure nitrogen peroxide, hydrogen peroxide ($H_2O_2$), liquid oxygen, or fluorine containing oxidizers, such for instance as perchloryl fluoride ($ClO_3F$) or chlorine trifluoride ($ClF_3$).

Example 10

The constituents and the preparation are the same as in Example 9 but the percentages are 50% for each of the constituents.

As in the preceding case, when the solid fuel component thus obtained is exposed to air, it does not ignite spontaneously but its surface gets covered with a protective layer of alumina. But if this protective layer is scratched and locally removed spontaneous igintion takes place, the combustion being however temporary and stopping due to the fact that the film of alumina gets again formed.

On the contrary, as in the preceding example, this component, when it is not covered with the protective alumina layer, can react spontaneously when it is placed in contact with an oxidizer stronger than air such as one of those cited in Example 9.

Consequently, if it is desired to obtain a component which will react spontaneously when brought into contact with one of the stronger oxidizers mentioned in Example 9, the formation of the projective layer of alumina will be avoided and this layer will be replaced at least partly by a protective layer having an inhibiting action with respect to air but hypergolic with said oxidizers.

This layer may consist of a polystyrene dissolved in a solvent (for instance benzene) until there is obtained a thick oil in which is incorporated from 20 to 30% of lithium hydride and/or lithium amidide.

Example 11

The constituents and the preparation are the same as in Examples 9 and 10, but the proportions will be 70% of aluminum triethyl and 30% of Afcolene T.F. 100.

The fuel component thus obtained, when placed in the presence of air, gets covered with a layer of alumina which protects it against further oxidation. On the contrary, when this protective layer is scratched and locally removed, spontaneous ignition takes place, but contrary to what takes place in the case of Example 10, the combustion thus started does not stop.

We may, as in Example 10, obtain a component inhibited against the oxidizing action of air but reacting spontaneously when it is placed in contact with stronger oxidizers such as those cited in Example 9, by avoiding the formation of the protective layer of alumina and replacing it at least partly by a protective layer having an inhibiting action with respect to air but hypergolic with said stronger oxidizers, such as cited in Example 9.

We may consider using a solid fuel containing 70% of aluminum triethyl which makes it hypergolic with air in the absence of any protective layer, in a propelling motor according to the invention where the protective layer has been eliminated at least partly, and using as oxidizing fluid component the oxygen of the atmosphere. Elimination of the protective layer may be obtained for instance by a preheating and/or strong blowing of said layer. This will take place for instance in the case of a motor arranged as a ram jet where, said motor having been brought to the desired height and velocity through any suitable means and the air stream that flows therethrough having eliminated the protective layer, the hypergolic reaction between the oxygen of the atmosphere and the fuel solid component then takes place spontaneously, that is to say hypergolically. Of course, elimination of the protective layer may be advantageously facilitated and made more active through any suitable means, for instance mechanical or chemical means, or by heating.

Alternately, if the protective layer is, as above stated efficient against the action of air but capable of reacting hypergolically with a stronger oxidizer (for instance nitric acid), during a first step of operation this protective layer will be eliminated by hypergolic reaction with the stronger oxidizer, and thereafter, the hypergolic combustion with the oxygen of the atmosphere will take place.

According to another feature of our invention the solid fuel component comprises, in addition to the hypergolic constituent, on the one hand, a powder of at least one metal, such as aluminum, beryllium, magnesium, lithium having a high energetic power and capable of forming during the combustion a metallic compound, preferable liquid or gaseous at high temperature, and, on the other hand, a plastic constituent, preferably a thermoplastic one, intended in particular to facilitate, by its local melting and sublimation, the evacuation of said metallic compound.

Preferably in this case, and as it will be hereinafter supposed, the two components of the system are made in such manner that the solid fuel component consists exclusively of fuel constituents and the fluid oxidizer component consists exclusively of one or several oxidizer constituents.

Of course, as above stated, the hypergolic qualities of the fluid and solid components are to be considered with respect to each other. For instance, fuel components which are hypergolic with fluorine are not necessarily hypergolic with nitric acid.

We preferably choose the hypergolic solid constituents of the solid component of the system in such manner that they can be incorporated in the form of a solid solution or a dispersion into the plastic constituents, in particular the thermoplastic one, of said solid component.

The metallic powder to be incorporated into said solid component must have very fine grains, so that these grains burn very quickly and with a high yield of combustion.

For this purpose, it is advantageous to use a powder the grains of which have a maximum dimension lower than 10 microns and, preferably, than 2 microns.

The oxidizer fuel constituent or constituents is or are, preferably, chosen among those above cited in the first column of the above table.

We will now give indications concerning the solid component containing a metallic powder to be used with a fluid oxidizer hypergolic therewith, said fluid oxidizer being for instance $NO_3H$, or $NO_3H$ in solution in $N_2O_4$, or fluorine or a halogen oxidizer.

Said solid fuel component may include:

As hypergolic constituent, a solid organic amine, in particular paratoluidine (melting point 50° C., sublimation point 200° C.), or one of the above mentioned organic amines;

As metallic powder, aluminum powder of a fineness of grain averaging two microns, and As thermoplastic constituent, polyvinyl chloride plasticized by means of an ester such as butyl phthalate, such a kind of plastic material being found on the market in the liquid form ("Rhodopas X" series, in particular "Rhodopas X5, X50 and X97," manufactured by the Rhone-Poulenc firm). This last mentioned constituent may or may not be hypergolic with the fluid oxidizer. For instance, with $NO_3H$, either with or without $N_2O_4$, it is not hypergolic. But with fluorine it is hypergolic.

We preferably choose the following composition ranges: hypergolic constituent, from 30 to 60%, thermoplastic constituent proper, from 5 to 20%, plasticizer, from 0 to 25%, metallic powder (aluminum, beryllium, magnesium), from 5 to 50%.

We use the melting method with the mixing of the molten constituents, for instance, as described in Example 4.

The proportions may be, for instance, those of the following example.

Example 12

We obtained advantageous results by choosing the following percentages which are given merely by way of example:

|  | Percent |
|---|---|
| Paratoluidine | [1] 51 |
| Polyvinyl chloride | 11 |
| Butyl phthalate | 18 |
| Aluminum and/or beryllium and/or magnesium | [2] 20 |

[1] Possibly from 31% to 56%.
[2] Possibly from 15% to 40%.

This mixture is prepared by melting as indicated in Example 4.

If it is desired to reduce to a minimum the surface of contact of the solid fuel component with the fluid oxidizer, and therefore to reduce the dimensions of the block, it is necessary and possible to increase the proportion of paratoluidine.

In the preceding examples, the homogeneity of a solid fuel block results from the fact that, during its preparation, at least one of the constituents thereof is in the liquid state (either naturally or because it has been brought into this state by melting) and the other constituents are incorporated thereto in any suitable manner, by dissolution, by intimate mixing, by a suitable chemical reaction, solidification of said block (which may possibly result from a polymerization) being complete after cooling but taking place only after the component has been applied to the desired place, or shaped, when still in the liquid or pasty state. But, in some cases, the fuel component intended to become solid cannot be obtained in the liquid or pasty form which permits of applying it at the desired place, or of shaping it, by solidification as in the preceding case, either because the proportion of the constituent liquid at ambient temperature is too small, or because the melting of at least one of the constituents cannot be performed, for instance either because the melting temperature would be so high as to involve alteration of one of the constituents, or because noxious and undesired reactions might take place at this temperature between some of these constituents.

In such a case we use a modified method according to which the constituents that are used permit a shaping and an agglomeration by compression under a high rate of compression, during a given time and at a temperature such that the above mentioned drawbacks are avoided. In this modification, homogenizing is obtained by an intimate mixing, possibly associated with a desired chemical reaction, and solidification is obtained by agglomeration possibly combined with polymerization.

Thus, to the solid hypergolic fuel constituents above considered we may add, according as the case may be, and as explained in the following examples, polyvinyl chloride (either in the state of a paste or in that of a powder), butadienes and/or isoprenes (in the state of a paste), polyethylenes (in the state of a powder), polyamides (in the powder state), polyester (in the state of a powder), polystyrene (in the state of grains or of a powder), polyurethane, and also metallic powders with, for said last mentioned powders, all the advantages resulting from their use and which have been explained hereinabove (see for instance Example 12).

The method of preparation by compacting or compression may also apply to the formation of solid oxidizer components when they consist of oxidizers capable of being agglomerated together (such cases possibly occurring in Groups IC, ID and IIC) or when they further include at least one supplementary constituent which is a fuel and which may participate in this agglomeration (this case may occur in Group IID).

In Examples 13 to 16, which will follow, the solid fuel component contains, as supplementary constituent, at least polyvinyl chloride.

Example 13

In this example, the solid fuel component and the fluid oxidizer component are the same as in Example 7. But the solid fuel component is obtained as follows.

The constituents thereof (i.e. from 40 to 95% of paraphenylene-diamine and from 60 to 5% of a mixture of 30% of polyvinyl chloride and 70% of butyl phthalate), in the state of powders, are intimately mixed together and the mixture is given the desired shape, being compressed at 100–150 kgs./cm.$^2$, and heated at 120° C. for a time ranging from a quarter of an hour to one hour.

Example 14

In this example, the solid fuel component and the fluid oxidizer component are the same as in Example 8. But the solid fuel component is obtained as follows:

The constituents thereof (i.e. 85% of paraphenylene-diamine and 15% of a mixture of 30% of polyvinyl chloride, 30% of butyl phthalate and 40% of paratoluidine), in the state of powders, are intimately mixed together and the mixture is given the desired shape, being compressed at 100–150 kgs./cm.$^2$, and heated at 120° C. for a time ranging from a quarter of an hour to one hour.

Example 15

The hypergolic constituent is metatoluene-diamine: 85%. The supplementary constituent is plastified polyvinyl chloride, for instance Rhodopas X5, mentioned in Example 11, in the proportion of 15%.

Metatoluene-diamine in the state of powder is mixed with polyvinyl chloride in the form of a paste. We thus obtain a powder which is shaped, compressed at a pressure ranging from 100–150 kgs./cm.$^2$, and heated at about 80° C. during about one hour.

The oxidizer is for example nitric acid.

The proportion of metatoluene-diamine may range from 40 to 95% of the solid component.

Example 16

The hypergolic constituent is naphthylene-diamine: 95%. The supplementary constituents is plastified polyvinyl chloride for instance Rhodopas X5, in the proportion of 5%.

Naphthylene-diamine in the state of powder is mixed with polyvinyl chloride in the state of a paste. We thus obtain a powdery mixture which is shaped, compressed at a pressure ranging from 100–150 kgs./cm.$^2$, and heated at about 120° C. for about one hour.

The oxidizer is for instance a mixture of nitric acid (60%) and of nitrogen peroxide (40%).

The proportion of metatoluene-diamine may range from 40 to 95% of the solid component.

In the following Examples 17 to 24 the solid fuel component contains, as supplementary constituent, at least polyurethane.

Example 17

The solid component consists of 80% of paraphenylene-diamine (hypergolic constituent) and 20% of polyurethane (less reactive or supplementary constituent).

In this example two cases are to be considered, to wit:

(a) The polyurethane is formed in situ, and, in this case, the solid component is prepared as follows: To 80% of paraphenylenediamine (powder) we add 7% of isocyanate (for instance toluene diisocyanate, liquid) and 13% of polyol (liquid mixture of several alcohols) such for instance as that known under the trademark Pluralcool TP440 manufactured by Kuhlman (France). The three substances are mixed together. The powdery mixture thus obtained is shaped, compressed under a pressure of 100–150 kgs./cm.$^2$ at a temperature averaging 80° C. for about one hour.

(b) The polyurethane is manufactured in advance and, in this case, the solid component is prepared as follows. To the polyurethane in the state of powder, paraphenylene-diamine is mixed, also in the powder state. The mixture is given the desired shape and compressed under a pressure of 100–150 kgs./cm.$^2$ at a temperature averaging 120° C. for a time ranging from a quarter of an hour to one hour.

The fluid oxidizer component may be any of the bodies indicated in the fifth column of the above table as hypergolic with organic amines.

Example 18

This example differs from the preceding one in that the proportions in the solid component are 90% of paraphenylene-diamine and 10% of polyurethane. This solid component is prepared as in Example 17, i.e. according to either of the methods of preparation above cited. The proportion of paraphenylene-diamine may range from 70 to 90% of the solid component.

Example 19

The solid component consists of 80% of naphthylene-diamine 1-5 (hypergolic constituent) and 20% of polyurethane (less reactive constituent).

The solid component is prepared in one of the two manners above stated for Example 17, paraphenylene-diamine being, of course, replaced by naphthylene-diamine 1-5.

Example 20

This example differs from the preceding one in that the proportions in the solid component are 90% of naphthylene-diamine 1-5 and 10% of polyurethane. The proportion of naphtylene-diamine may range from 70 to 90% of the solid component.

Example 21

The hypergolic constituent is lithium and/or potassium and/or sodium hydride and the supplementary constituent is polyurethane formed "in situ" from toluene diisocyanate and a polyol such as Pluralcool TP440 manufactured by the Kuhlman firm, the relative proportions of these constituents being the same as those given with reference to Example 17(a). The oxidizer is chlorine trifluoride (ClF$_3$). The proportion of the hypergolic constituent may range from 50 to 80% of the solid component.

Example 22

This example is identical to Example 21, lithium and/or potassium and/or sodium hydride being replaced, either partly or wholly, by at least one of the lithium and/or potassium and/or sodium amidides.

The proportion of the hypergolic constituent may range from 50 to 80% of the solid component.

Example 23

The hypergolic constituent is lithium and/or potassium and/or sodium hydride, from 50 to 75% and there are two supplementary constituents, which are, respectively, polyurethane, 10%, and aluminum, from 15 to 40%.

The method of preparation of polyurethane is the same as in Example 17.

The oxidizer is chlorine trifluoride (ClF$_3$).

Example 24

This example differs from Example 23 in that aluminum is replaced, either wholly or partly, by beryllium and/or magnesium.

In the following Examples 25 to 31, the solid fuel component contains, as supplementary constituent, polyethylene and/or polystyrene.

Example 25

The solid component consists of 80% of paraphenylene-diamine (hypergolic constituent) and 20% of polyethylene (supplementary constituent).

This solid component is prepared as follows: Paraphenylene-diamine and polyethylene, both in the form of a powder, are mixed together, given the desired shape and compressed at a pressure of 100–150 kgs./cm.$^2$ at a temperature of about 100° C. for a time ranging from a quarter of an hour to one hour.

The fluid oxidizer component may be any of the bodies indicated in the fifth column of the above table as hypergolic with organic amines.

Example 26

This example differs from the preceding one in that the proportions in the solid component are 90% of paraphenylene-diamine and 10% of polyethylene. This solid component is prepared as in Example 25.

Example 27

The solid component consists of 80% of naphthylene-diamine 1-5 (hypergolic constituent) and 20% of polyethylene (supplementary constituent).

This solid component is prepared as in Example 25, paraphenylene-diamine being replaced by naphthylene-diamine 1-5 and the temperature of treatment may reach 120° C.

The fluid oxidizer component may be any of the bodies indicated in the fifth column of the above table as hypergolic with organic amines.

Example 28

This example differs from the preceding one in that the proportions in the solid component are 90% of naphtylene-diamine 1-5 and 10% of polyethylene. This solid component is prepared as in the preceding Example 27.

Example 29

The hypergolic constituent is metatoluene-diamine: 90% and the supplementary constituent is polyethylene: 10%.

Metatoluene-diamine in the state of powder is mixed with polyethylene also in the state of powder. The mixture is shaped, compressed at a pressure ranging from 100 to 150 kgs./cm.$^2$ and heated to about 80° C. for a time ranging from a quarter of an hour to one hour.

The oxidizer may be any of those of the preceding table, for instance nitric acid, nitrogen peroxide or a mixture of these two bodies.

Example 30

This example is similar to the preceding one but the proportion of metatoluene-diamine is 80% and that of polyethylene is 20%.

In Examples 25 to 30 inclusive, polyethylene may be replaced, either wholly or partly, by polystyrene.

Furthermore, the proportion of hypergolic constituent may range from 40 to 90% of the weight of the solid component.

Example 31

The hypergolic constituent is one of the following powders or a mixture of two or more of them: lithium hydride, lithium amidide, lithium borohydride, lithium alumino-hydride, sodium hydride, sodium amidide, sodium borohydride, potassium hydride, potassium amidide and potassium borohydride, in the proportion of 90%. The supplementary constituent is polyethylene and/or polystyrene in the form of powder, in the proportion of 10%. The whole is mixed, given the desired shape, and compressed to about 150 kgs./cm.$^2$, at a temperature of about 80° C., for a time ranging from a quarter of an hour to one hour.

The oxidizer is chlorine trifluoride (ClF$_3$).

In the following Examples 32 and 33, the solid fuel component contains, as supplementary constituent, at least one polyester.

Example 32

The hypergolic constituent is at least one body of the group consisting of lithium hydride, lithium amidide, lithium borohydride, sodium hydride, sodium amidide, sodium borohydride, potassium hydride, potassium amidide and potassium borohydride, in the proportion of 50 to 75%. The supplementary constituents are from 40 to 15% of aluminum and/or beryllium and/or magnesium in the state of powder, and 10% of a polyester such as Stratyl A16, already cited (Example 1).

Lithium hydride and/or lithium amidide and/or lithium, potassium or sodium borohydride and aluminum and/or beryllium in the state of powders, are mixed with the plastified polyester (Stratyl A16) in the state of a paste. We thus obtain a powdery mixture, which is compressed at a pressure ranging from 100–150 kgs./cm.$^2$ for about one hour at a temperature ranging from 50 to 100° C.

The oxidizer consists of chlorine trifluorine (ClF$_3$)

Example 33

The solid fuel component consists of 96% of at least one body of the group consisting of lithium hydride, lithium amidide, lithium borohydride, sodium hydride, sodium amidide, sodium borohydride, potassium hydride, potassium amidide and potassium borohydride, which is the hypergolic constituent, and 4% of a polyester such as Stratyl A16, above mentioned.

The two constituents (hypergolic constituent in the state of powder and polyester in the viscous state) are mixed together, given the desired shape, compressed at a pressure of 100–150 kgs./cm.$^2$ during about one hour at 100° C.

The fluid oxidizer is ClF$_3$, which is hypergolic with lithium hydride.

In this example, the hypergolicity and the specific impulse are improved.

In the following Examples 34 and 35, the solid fuel component comprises, as supplementary constituent, at least one polyamide.

Example 34

The hypergolic constituent is para-anisidine and/or metatoluene-diamine in the state of powder, the percentage of this constituent being 85%. The supplementary constituent is a polyamide (for instance nylon) in the state of powder and in the proportion of 15%.

These powders are mixed together, given the desired shape, compressed to about 150 kgs./cm.$^2$ and heated to a temperature which must not exceed 50° C., for about one hour.

The proportion of hypergolic constituent may range from 70 to 90% of the weight of solid component.

The oxidizer is for instance nitric acid.

Example 35

This example is the same as the preceding one, with the difference that the hypergolic constituent is naphthylene-diamine and that the maximum temperature is in this case 120° C.

In Examples 34 and 35, aluminum and/or beryllium and/or magnesium in the state of powder, in a proportion ranging from 15 to 40%, may be incorporated in the solid fuel component, the proportion of hypergolic constituent then ranging from 30 to 55%.

In the following Examples 36 and 37, the solid fuel component contains, as supplementary constituent, at least one butadiene and/or one isoprene.

Example 36

The hypergolic constituent is lithium hydride and/or potassium hydride, and/or sodium hydride, and/or lithium amidide, and/or potassium amidide, and/or sodium amidide, in the proportion of 85%.

The supplementary constituent is butadiene and/or isoprene, in the proportion of 15%.

Butadiene or isoprene are generally in the form of a very compact putty. Lithium hydride and/or lithium amidide in the form of powder are incorporated therein through mechanical means, for instance by calendering. Shaping is effected by compressing at a pressure ranging from 100 to 150 kgs./cm.$^2$ the fragments that are obtained, this compression being performed at ordinary temperature or at 60° C. for an hour.

The proportion of hypergolic constituent may range from 70 to 90% of the weight of solid component.

The oxidizer is preferably a halogenated one, for instance chlorine fluoride.

Example 37

The hypergolic constituent is lithium hydride and/or potassium hydride and/or sodium hydride and/or lithium amidide and/or potassium amidide and/or sodium amidide, in the state of powder, in the proportion of 60%.

The supplementary constituents are aluminum and/or beryllium and/or magnesium powder (30% possibly from 15 to 40%) and isoprene and/or butadiene (10%).

The proportion of hypergolic constituent may range from 70 to 50 of the weight of solid component.

The preparation is the same as for Example 36 the aluminum and/or beryllium and/or magnesium powder being preliminarily mixed with lithium hydride and/or amidide.

The oxidizer is the same as for Example 36.

The advantages required from the supplementary constituents of the fuel solid component according to the preceding examples are to permit of disciplining the reaction and to adjust its burning velocity, to determine both the delay of ignition and the specific impulse, in other words to adjust to a desired purpose the conditions of operation with respect to what would take place if the hypergolic constituent were used alone.

It should be noted that the delay of ignition of the fuel solid component hypergolic with the oxidizer fluid component may be reduced by covering the surface of said solid fuel component which is to enter into reaction with the oxidizer fluid component by a second solid fuel component hypergolic with said oxidizer fluid component and the delay of ignition of which is shortened to the desired value, for instance, according to the following Examples (38, 39 and 40)

Example 38

This layer consists of polyvinyl chloride (about 23%), butyl phthalate (about 35%) and lithium hydride (about 42%).

Polyvinyl chloride, together with its plasticizer (butyl phthalate), the whole forming a paste, are intimately mixed with lithium hydride in the powder state.

The putty-like substance thus obtained is spread on the surface to be coated. Polymerization takes place gradually at ambient temperature, during a period of time ranging from 24 to 48 hours.

Example 39

This layer consists of from 10% to 45% of lithium hydride and from 90% to 55% of paratoluidine.

Paratoluidine in the solid state (powder or fragments) is heated past to the melting point (45° C.). Lithium hydride powder is added thereto, in small amounts and while stirring the whole. Care is taken not to allow the temperature to rise above 50° C. The suspension thus obtained is applied in any suitable manner (by means of a brush or of an atomizer for instance) on the surface to be coated, where it solidifies when cooling down.

Lithium hydride may be replaced, at least partly, by sodium hydride and/or potassium hydride and/or lithium amide and/or potassium amidide and/or sodium amidide.

The layers of Examples 38 and 39 are highly reactive but require for storing a fluidtight closure of the chamber in which they are located (in particular against moisture when being stored). They may be replaced by another kind of layer free from said requirements as described by the following example.

Example 40

The layer consists of paraphenylene-diamine which not only has a more hypergolic character than the remainder of the solid hypergolic component but further protects said remainder against any possible alteration by the atmosphere during storage.

Said layer is obtained by melting paraphenylene-diamine (at 138° C.) and applying it in any suitable manner, for instance by means of a brush or an atomizer, at the desired place, on the surface to be coated.

(IB): We will now consider the case where the hypergolic solid component is a fuel and the hypergolic fluid component is an oxidizer, the fluid component comprising, on the one hand, at least one oxidizer constituent hypergolic with the solid fuel component, and on the other hand, at least one supplementary oxidizer constituent the nature and relative amount of which are capable of adjusting the reactivity and the energetic power of the hypergolic system formed by said components and, in particular, which may be less reactive with said solid fuel component.

Example 41

The hypergolic oxidizer fluid constituent is nitric acid (of a density equal to 1.52). The supplementary oxidizer fluid constituent is nitrogen peroxide (a highly volatile liquid, boiling at 19° C.). The percentages by weight are 85% of nitric acid and 15% of nitrogen peroxide.

The hypergolic fuel solid component may be one or several constituents chosen among lithium hydride (HLi), beryllium hydride, potassium hydride (HK), sodium hydride (HNa), aluminum hydride, lithium amidide

(NH$_2$Li)

potassium amidide, sodium amidide (NH$_2$Na), lithium borohydride (BH$_4$Li) potassium borohydride (BH$_4$K), sodium borohydride (BH$_4$Na), beryllium borohydride, lithium alumino-hydride (LiAlH$_4$), potassium alumino-hydride, sodium alumino-hydride organic amines, in particular paratoluidine, xylidine 1-3-4, para-anisidine, meta-toluene diamine, parachloroaniline, paraphenylene-diamine, naphtylene diamine 1-5. Said fuel component may be either molten or sintered.

In particular the fuel component may consist of a mixture of 85% of paratoluidine and 15% of a mixture containing 45% of polyvinyl chloride and 55% of butyl phthalate, this mixture being obtained by melting, as in Example 4.

The advantages due to the supplementary constituent are to increase the specific impulse and the burning velocity.

Example 42

The constituents are the same as in Example 41 but, in order to increase the density of the fluid mixture (and therefore to reduce the dimensions and the weight of the tank to be provided for this mixture) the proportion of nitrogen peroxide is higher and may reach 40%, the proportion of nitric acid (of a density equal to 1.64) being then 60%.

Example 43

The hypergolic oxidizer fluid constituent is nitric acid (of a density equal to 1.52). The supplementary oxidizer fluid constituent is perchloric acid in aqueous solution at 65%. The percentages by weight are 89% for nitric acid, 10% for the perchloric acid solution, and 1% of 66° B. sulfuric acid (intended to fix the water of the perchloric acid solution so as to lead to the formation in situ of nitronium perchlorate ($ClO_4NO_2$) in nitric acid.

In a likewise manner it is possible to dissolve nitrium perchlorate prepared in advance in nitric acid.

The hypergolic fuel solid component may be chosen among those cited in Example 41.

In this example the advantages supplied by the supplementary constituent are the same as those stated concerning Example 41. Furthermore, the hypergolicity is improved.

(IA+IB): We will now consider the case where the solid fuel component is according to IA and the fluid oxidizer component is according to IB.

Example 44

In this example, the solid fuel component is that of Example 32 or that of Example 33, and the fluid oxidizer component consists of a mixture of $ClO_3F$ and $ClF_3$, ranging from 50% and 85% (advantageously 70%) of $ClF_3$ and from 50 to 15% (advantageously) of $ClO_3F$, the latter, taken alone, being non-hypergolic with the solid fuel component, but its oxygen serving to burn the carbon of the polyester (Stratyl A16), thus increasing the specific impulse.

Example 45

The hypergolic oxidizer constituent is $NO_3H$. The supplementary oxidizer constituent is $N_2O_4$.

The solid fuel component is a mixture of from 95% to 70% preferably of a hypergolic constituent consisting of metatoluene diamine, and from 5% to 30% of a supplementary constituent consisting of a mixture of 25% of butyl phthalate, and 75% of a polyamide such as nylon.

The solid fuel component may be obtained by adding to the molten metatoluene diamine the mixture forming the supplymentary fuel.

In a modification we use metatoluene diamine in the state of powder mixed with the mixture forming the supplementary fuel, the whole being given the desired shape by compression at about 100–150 kgs./cm.$^2$ and heating at a temperature of the order of about 80° C. for a time ranging from a quarter of an hour to one hour.

Example 46

This example is analogous to the preceding one but the proportion of metatoluene diamine is 80% and the proportion of the mixture of butyl phthalate and nylon is 20%.

(IC) We will now consider the case where the hypergolic solid component is an oxidizer and the hypergolic fluid component is a fuel, the fluid component comprising, on the one hand, at least one fuel constituent hypergolic with the solid oxidizer component and, on the other hand, at least one supplementary fuel constituent less reactive with the solid oxidizer component.

Example 47

The hypergolic fluid fuel constituent is furfuryl alcohol.

The supplementary fluid fuel constituent is dimethylhydrazine, which serves to adjust the time of ignition and the specific impulse. For instance the mixture contains from 30% to 70% of dimethylhydrazine and from 70% to 30% of furfuryl alcohol.

As for the hypergolic solid oxidizer component it consists of nitronium perchlorate. This nitronium perchlorate in the form of a powder is given the desired shape at ambient temperature by compression under a pressure of 100–150 kgs./cm.$^2$.

(ID) We will now consider the case where the hypergolic solid component is an oxidizer and the hypergolic fluid component is a fuel, the solid component comprising, on the one hand at least one oxidizer constituent hypergolic with the fluid fuel component and on the other hand, at least one supplementary oxidizer constituent the nature and relative amount of which are capable of adjusting the reactivity and the energetic power of the hypergolic system formed by said components and, in particular, which may be less reactive with said fluid fuel component.

Example 48

The fluid fuel component is furfuryl alcohol and the fuel solid component consists of from 70% to 30% of nitronium perchlorate, hypergolic with furfuryl alcohol, and from 30% to 70% of ammonium perchlorate (supplementary oxidizer constituent). This solid component is obtained by mixing these constituents in the state of powders and compressing the mixture to the desired shape, under a pressure of 150 kgs./cm.$^2$.

(IC+ID) We will now consider the case where the fluid fuel component is according to IC and the solid oxidizer component is according to ID.

Example 49

In this example the fluid fuel component is the same as in Example 47 (mixture of furfuryl alcohol and of dimethylhydrazine) and the solid oxidizer component is the same as in Example 48 (nitronium perchlorate and of ammonium perchlorate).

(IIA) We will now consider the case where the fluid component has the character of an oxidizer and the solid component has the character of a fuel and comprises at least one fuel constituent which is hypergolic with said fluid oxidizer component and at least one supplementary constituent consisting of an oxidizer which is not hypergolic with said fuel solid constituent and mixed therewith.

Example 50

The solid fuel component consists of:

From 20 to 30% of lithium hydride (hypergolic fuel constituent).

From 80 to 70% of a mixture of 10–20% of ammonium perchlorate (oxidizer not hypergolic with the fuel) and 90–80% of a polyethylene (supplementary fuel).

The fluid oxidizer component is any of the following bodies: nitric acid, hydrogen peroxide, liquid bromine, liquid chlorine, liquid fluorine, oxygen fluoride, bromine oxide, chlorine trifluoride, bromine pentafluoride.

The advantages resulting from the provision of at least one oxidizer constituent in the solid fuel component are as follows:

(a) It decreases the volume of the fluid component by an amount corresponding to that of the oxidizer in the solid component;

(b) When the injection of liquid is cut off, the surface of the solid component remains clean and clear of any deposit which might interfere with reignition.

(IIB) We will now consider the case where the solid component has the character of a fuel and the fluid component has the character of an oxidizer and comprises at least one oxidizer constituent which is hypergolic with said solid fuel component and at least one supplementary constituent consisting of a fuel which is not hypergolic with said oxidizer constituent and mixed therewith.

Example 51

The fluid oxidizer component consists of a stable mixture of:

| | Percent |
|---|---|
| Nitric acid (hypergolic oxidizer) | 85–95 |
| Acetonitrile ($CH_3C\equiv N$) (supplementary fuel) | 15–5 |

The hypergolic fuel solid component comprises at least one of the following fuels: lithium hydride (HLi), beryllium hydride, potassium hydride (HK), sodium hydride (HNa), aluminum hydride, lithium amidide ($NH_2Li$), potassium amidide, sodium amidide ($NH_2Na$), lithium borohydride ($BH_4Li$), potassium borohydride ($BH_4K$), sodium borohydride ($BO_4Na$), beryllium borohydride, lithium alumino-hydride ($LiAlH_4$), potassium alumino-hydride, sodium alumino-hydride, and organic amines, in particular paratoluidine, xylidine 1–3–4, para-anisidine, metatoluene diamine, parachloraniline, paraphenylene-diamine, naphthylene-diamine 1–5.

According to its nature, the solid component is formed either by melting or by compressing a powder or powders.

Example 52

The fluid oxidizer component consists of a stable mixture of:

from 85 to 95% of nitric acid (hypergolic oxidizer), and from 15 to 5% of amyl acetate (supplementary fuel).

The hypergolic fuel solid component may be the same as in Example 51.

(IIC) We will now consider the case where the solid component has the character of a fuel and the fluid component has the character of an oxidizer and comprises at least one fuel constituent which is hypergolic with said solid oxidizer component and at least one supplementary constituent consisting of an oxidizer which is not hypergolic with said fuel fluid constituent and mixed therewith.

Example 53

The solid hypergolic oxidizer component may be either nitronium perchlorate, or a mixture of 90% of nitronium perchlorate and 10% of ammonium perchlorate.

The fluid fuel component consists of a mixture of:
from 85 to 95% of dimethyl hydrazine (hypergolic fuel) and,
from 15 to 5% of hydrogen peroxide (supplementary oxidizer).

If the solid hypergolic oxidizer component consists of nitronium perchlorate, the desired shape is given by compressing the powder at a pressure ranging from 100 to 150 kgs./cm.² at ambient temperature.

If the solid hypergolic oxidizer component is a mixture of nitronium perchlorate and of ammonium perchlorate, these bodies, in the form of powders, are mixed together and the mixture is compressed, in the desired shape, at a pressure of 100 to 150 kgs./cm.², at ambient temperature.

The advantages resulting from the provision of the supplementary oxidizer constituent in the fluid fuel component are as follows:

(a) The volume of the solid phase is reduced by an amount corresponding to that of the fuel in the fluid phase;

(b) When the fluid fuel component is in contact with the solid oxidizer component not only does the dimethyl hydrazine constituent react with said solid oxidizer component but it reacts also with the hydrogen peroxide, thus raising the temperature more than would result from the combustion of all the dimethyl hydrazine with only the hypergolic solid oxidizer;

(c) Finally, although the liquid tank must be made of greater volume, the combustion chamber is a little smaller than if there was no supplementary oxidizer in the fluid fuel component, which may be advantageous in some cases.

(IID) We will now consider the case where the fluid component has the character of a fuel and the solid component has the character of an oxidizer and comprises at least one oxidizer constituent which is hypergolic with said fuel fluid component and at least one supplementary constituent consisting of a fuel which is not hypergolic with said oxidizer solid constituent and mixed therewith.

Example 54

The solid oxidizer component consists of, on the one hand, a mixture of from 90% to 95% of nitronium perchlorate forming the solid oxidizer constituent hypergolic with the fluid fuel component, and, on the other hand, from 10% to 5% of polyethylene, forming the supplementary constituent which, in this case, is a fuel, of course not hypergolic with the solid oxidizer constituent.

The fluid fuel component comprises at least one of the following bodies: furfuryl alcohol, hydrazine, asymmetrical hydrazine, dimethyl or triethylamine and xylidine.

The chief advantage of the provision of the supplementary solid fuel constituent is that it varies, and in particular attenuates, the rate of decomposition of nitronium perchlorate.

(IIA + IIB) Of course and as it results from what precedes, hypergolic systems (comprising a fluid component and a solid component) according to the invention, may be such that the fluid component comprises at least one hypergolic oxidizer constituent hypergolic with the solid component and at least one supplementary fuel constituent not hypergolic with said fluid oxidizer, as in Group IIA, and the solid component comprises at least one fuel constituent hypergolic with the fluid component and at least one supplementary oxidizer constituent not hypergolic with said solid fuel constituent, as in Group IIB.

Example 55

The fluid component is a mixture of nitric acid (hypergolic fluid oxidizer) and acetonitrile (supplementary fluid fuel), for instance in the proportions given in Example 51. The solid component comprises lithium hydride (hypergolic solid fuel) and a mixture of polyethylene and ammonium perchlorate (supplementary oxidizer), for instance in the proportions given in Example 50.

(IIC + IID) The fluid component comprises at least one fuel constituent hypergolic with the solid component and at least one supplementary oxidizer constituent not hypergolic with said fuel constituent as in Group IIC, and the solid component comprises at least one oxidizer constituent hypergolic with the fluid component and at least one supplementary fuel constituent not hypergolic with said last mentioned oxidizer; as in Group IIB.

Example 56

The fluid component is a mixture of dimethyl hydrazine (hypergolic fluid fuel constituent) and hydrogen peroxide (supplementary fluid oxidizer constituent) for instance in the proportions given in Example 53.

The solid component comprises nitronium perchlorate as hypergolic solid oxidizer constituent, and polyethylene, as supplementary solid fuel constituent, for instance in the proportions given in Example 54.

(III) We will finally consider the case where at least one of the components (either the fluid one or the solid one) of the hypergolic system comprises at least three constituents at least one of which is of a character (either fuel or oxidizer) opposed to that of said component.

The above stated Examples 50 and 55 correspond to this case. In addition we will give the following example.

Example 57

The fluid component is a mixture of nitric acid (hypergolic fluid oxidizer constituent) and nitrogen peroxide (less reactive constituent) and acetonitrile in the following proportions: nitric acid 55%, nitrogen peroxide 35%, acetonitrile 10%, the mixture being effected by first mixing nitric acid with nitrogen peroxide and then acetonitrile to the mixture of nitric acid and nitrogen peroxide.

The solid component consists of a mixture of 17% of $ClO_4NH_4$ and 83% of the fuel mixture indicated in Example 4 and consisting of 85% of paratoluidine and 15% of a mixture comprising 45% of polyvinyl chloride and 55% of butyl phthalate.

A rocket motor according to the present invention, in which the solid fuel component is according to Example 35 and the oxidizer liquid component is constituted by nitric acid, has a characteristic velocity averaging 1600 m./s., which, in the case of a rocket engine having a chamber pressure of 25 kgs./cm.$^2$, gives a specific impulse of the order of 220 seconds.

The rocket engine thus obtained has proved to be of a high flexibility of operation owing to the possibility of varying the thrust by variation of the rate of flow of the comburent. It has even been possible, without risking any dangerous excess of pressure, to stop combustion and to start it again by cutting off and then reopening the oxidizer fluid stream.

The system above described has many advantages among which the following may be cited:

Stability of combustion within a very wide range of values of the pressure in the combustion chamber;

Continuous variation of said presure as a function of the flow rate of oxidizer;

Possibility of adjoining regulating means and of complying with predetermined condition;

High performance;

Very high safety of operation;

Possibility of using, in hypergolic systems according to the invention, known bodies which had never been used in a rocket motor comprising two hypergolic components one of which is in the fluid state and the other in the solid state, and possibly new bodies.

What we claim is:

1. In a method of creating propulsion in a hybrid propellant system by reacting a stable solid phase fuel component in a rocket chamber with a stable liquid phase oxidizer component and expelling the resulting gases the steps of; selecting a solid phase fuel component and a liquid phase oxidizer component that are hypergolic with respect to each other; supplementing said solid phase fuel component with a fuel constituent that is less reactive to said liquid phase oxidizer component than is said solid phase fuel component and capable of adjusting the reactivity and energy release of the hypergolic system formed by said components, said supplemental fuel constituent comprising at least one material selected from the group consisting of polyesters, polyethylenes, polystyrenes, polyvinyl chlorides, polyamides and polybutadienes; said solid phase fuel component comprising at least one material selected from the group consisting of lithium hydride, lithium borohydride, lithium amidide, sodium hydride, sodium borohydride, sodium amidide, potassium hydride, potassium borohydride and potassium amidide, the proportion of said solid phase fuel component being from 40 to 96% by weight of the total solids; forming said solid phase fuel component in a rocket chamber as a body having an exposed face and passing a stream of said liquid phase oxidizer component over said exposed face to create a propulsion reaction.

2. In a method of creating propulsion in a hybrid propellant system by reacting a stable solid phase fuel component in a rocket chamber with a stable liquid phase oxidizer component and expelling the resulting gases the steps of; selecting a solid phase fuel component and a liquid phase oxidizer component that are hypergolic with respect to each other; supplementing said solid phase fuel component with a fuel constituent that is less reactive to said liquid phase oxidizer component than is said solid phase fuel component and capable of adjusting the reactivity and energy release of the hypergolic system formed by said components, said supplemental fuel constituent comprising at least one polyvinyl chloride plasticized with at least one plasticizer selected from the group consisting of butylphthalate, tricresyl phosphate and butyl adipate, the proportion by weight of plasticizer being at most 70% of the plasticized polyvinyl chloride; said solid phase fuel component comprising at least one material selected from the group consisting of paratoluidine, para-anisidine, paraphenylene-diamine, metatoluene-diamine and naphthylene-diamine, the proportions of said solid phase fuel component being from 70 to 95% by weight of total solids; forming said solid phase fuel component in a rocket chamber as a body having an exposed face and passing a stream of said liquid phase oxidizer component over said exposed face to create a propulsion reaction.

3. The method of claim 1 additionally including the step of coating at least the exposed face of said solid body, prior to passage of said liquid phase oxidizer component thereover, with a solid fuel coating substantially unreactive to air but hypergolic with said liquid phase oxidizer component and insoluble and non-miscible therein and comprising at least one fuel constituent capable of reacting hypergolically with said liquid phase oxidizer component, and at least one supplemental fuel constituent less reactive with said liquid phase oxidizer component than the first mentioned fuel constituent of said coating and capable of adjusting the reactivity and energy release of the hypergolic system formed by said liquid phase oxidizer component and said hypergolic coating so that delay of ignition is shortened to a given value.

4. The method of claim 3 in which said additional fuel coating includes by weight as its hypergolic constituent from 10 to 45% lithium hydride.

5. In a method of creating propulsion in a hybrid propellant system by reacting a stable solid phase fuel component in a rocket chamber with a stable liquid phase oxidizer component and expelling the resulting gases the steps of; selecting a solid phase fuel component and a liquid phase oxidizer component that are hypergolic with respect to each other; supplementing said solid phase fuel component with at least one fuel constituent less reactive to said fluid phase oxidizer than is said solid phase fuel component; supplementing said fluid phase oxidizer component with at least one fluid oxidizer constituent, the nature and relative amounts of each of said supplementary constituents being capable of adjusting the reactivity and energy release of the hypergolic system formed by said components; said solid phase fuel component consisting of 70 to 95% metatoluene-diamine, based on weight of total solids, the said supplemental constituent thereof consisting of a mixture of butylphthalate and polyamides; said fluid phase oxidizer component consisting of 60 to 85% of nitric acid, based on the weight of total fluids, the said supplemental constituent thereof consisting of nitrogen peroxide; forming said solid phase fuel component in a rocket chamber as a body having an exposed face and passing a stream of said liquid phase oxidizer component over said exposed face to create a propulsion reaction.

References Cited

UNITED STATES PATENTS

| | | | |
|---|---|---|---|
| 2,981,060 | 4/1961 | Barnes. | |
| 3,137,127 | 6/1964 | Grosse et al. | 60—219 |
| 3,147,710 | 9/1964 | Gluckstein | 149—2 X |
| 3,167,908 | 2/1965 | Dale | 60—219 |
| 3,203,171 | 8/1965 | Burke | 149—19 X |
| 3,206,341 | 9/1965 | Reyaaud et al. | 149—2 |
| 3,234,729 | 2/1966 | Altman | 149—19 X |
| 3,257,802 | 6/1966 | Kaufman | 149—2 X |
| 3,065,596 | 11/1962 | Schultz | 60—220 X |
| 3,065,597 | 11/1962 | Adamson | 60—220 |
| 3,065,598 | 11/1962 | Schultz | 60—220 |
| 3,093,960 | 6/1963 | Tyson | 60—219 X |
| 3,140,582 | 7/1964 | Tyson | 60—219 X |

BENJAMIN R. PADGETT, *Primary Examiner.*